United States Patent [19]
Muzio et al.

[11] Patent Number: 5,884,926
[45] Date of Patent: Mar. 23, 1999

[54] POSITIONING DEVICE FOR STABILIZING BARS, STABILIZING BAR AND STABILIZATION SYSTEM FOR VEHICLES USING THIS DEVICE

[75] Inventors: Carlo Muzio, Ivrea; Adriano Benenti, Rosta, both of Italy

[73] Assignee: Rejna S.p.A., Milan, Italy

[21] Appl. No.: 850,923

[22] Filed: May 2, 1997

[30] Foreign Application Priority Data

May 3, 1996 [IT] Italy ............................ TO96 A 000360

[51] Int. Cl.$^6$ ...................................................... B60P 7/00
[52] U.S. Cl. ..................................... 280/124.107; 267/189
[58] Field of Search ........................ 280/5.507, 124.107, 280/124.152, 124.166; 267/188, 189

[56] References Cited

U.S. PATENT DOCUMENTS 5,352,055  10/1994  Hellon et al. ............................ 403/24

FOREIGN PATENT DOCUMENTS

| 0 093 625 | 11/1983 | European Pat. Off. . |
| 0 251 845 | 1/1988 | European Pat. Off. . |
| 0 405 109 | 1/1991 | European Pat. Off. . |
| 0 500 329 | 8/1992 | European Pat. Off. . |
| 0 547 945 | 6/1993 | European Pat. Off. . |
| 86 493 | 5/1966 | France . |
| 2 564 043 | 11/1985 | France . |
| 2 263 250 | 7/1993 | United Kingdom . |
| WO 91/09748 | 7/1991 | WIPO . |

*Primary Examiner*—J. J. Swann
*Assistant Examiner*—Jim McClellan
*Attorney, Agent, or Firm*—Finnegan, Henderson, Farabow, Garrett & Dunner, L.L.P.

[57] ABSTRACT

A stabilizing or anti-roll bar for vehicles, of any shape, is provided with a positioning device including: a radial annular groove, continuous or discontinuous, of spherical profile, which is hot-machined, in pre-determined axial position on the external surface of a rectilinear part of the bar in the vicinities of supports of connection to the body of a vehicle; an annular plug made of a relatively hard and rigid elastomer material, provided with a radial through cut made along an entire generator of the plug, so that the plug can be opened in the circumferential direction so as to be fitted on the rectilinear part of the bar, the annular plug being internally provided with an annular projection which can be coupled into the said groove of the bar; and surrounding means suitable for being mounted externally on the plug to prevent the opening thereof and close a lateral internal surface thereof, with pre-determined force, against the external surface of the bar, to lock the plug axially with respect to the bar. The plug thus serves as an axial shoulder suitable for cooperating in use with the adjacent connection support of the bar, which may thus be of the type equipped with anti-friction sleeve which permits the rotation of the bar with respect to the support.

11 Claims, 1 Drawing Sheet

5,884,926

POSITIONING DEVICE FOR STABILIZING BARS, STABILIZING BAR AND STABILIZATION SYSTEM FOR VEHICLES USING THIS DEVICE

BACKGROUND OF THE INVENTION

The present invention relates to a transverse positioning device for stabilizing bars, which can easily be applied thereto, is effective and can easily be produced at reasonable cost. The invention also relates to a stabilizing bar equipped with such a device and to a stabilization system for vehicles making use of such a device.

The stabilizing bar, also known as "anti-roll bar", is a flexible component of the front and rear suspension of a motor vehicle, the function of which is to limit lateral oscillations and roll, contributing to improvements in "driving comfort" and roadholding. For each axle (pair of front wheels and pair of rear wheels) one or more bars are provided which connect together the wheel arms by which the other components of the suspension (helical springs, leaf springs, shock absorbers etc.) are supported. Each bar is secured to the body by means of two central supports, comprising rubber or rubber/metal bushes locked by metal clips of connection to the body, which do not usually permit the rotation of the bar inside the support nor its axial sliding, insofar as the compressed rubber adheres intimately to the bar, thus locking it.

In use, the bar, which is usually of trapezoidal shape (although it may also have a very complex shape) reacts with flexo-torsional stresses; the optimization of the stabilizing function aims to cause the bar to operate exclusively under torsion without inducing undesired components on the supports anchored to the vehicle chassis (body), and to have the highest possible speed of response on the passenger compartment. However, because of the anchoring system described, in use the rubber of the supports is required to operate under torsion also, and this produces a flexible chain formed not only by the steel of the bar but also by the rubber of the supports: the flexibility of the system is consequently increased, with a negative influence on the speed of response of the stabilization system.

To overcome this disadvantage the use has been proposed of stabilization systems in which the bar is connected to the vehicle chassis/body by means of supports equipped with anti-friction sleeves which thus permit, under torsional stresses, the free rotation of the bar with respect to the flexible sleeve without the latter being subject to torsional stress in its turn. However, the systems of this type have the problem of how to keep the bar in transverse position insofar as, thanks to the above-mentioned sleeves, not only is the bar free to rotate but also to travel with respect to the supports.

A first solution provides the production, in the vicinity of the supports, of bends in the bar such as to form elbows which act as stops: this solution does, however, have the disadvantage of creating in the bar appreciable bending stresses which reduce its stabilization efficiency and speed. A second solution, provided by international application No. WO91/09748, comprises co-moulding a plastic or rubber stop element on the bar: this element, once injection-moulded onto the external surface of the bar, should be axially locked onto it by the effect of the radial compression consequent upon the phenomenon of "contraction" (reduction of volume resulting from the solidification of the injected material) being thus able to act as a shoulder. This solution is not, however, entirely reliable because of critical ambient conditions (temperature, ozone, oils etc.) and, on the other hand, is extremely expensive in that the co-moulding requires injection presses and equipment that are extremely large, costly and cumbersome, because of the generally large dimensions of the bar (from 40–100 cm up to more than 1 meter) furthermore, with significant modifications to the normal production flows.

SUMMARY OF THE INVENTION

The object of the invention is to eliminate the disadvantages described, in particular not restricting the choice of material, by means of a system that is simple, effective, of reduced cost and low investment.

According to the invention, therefore, there is provided a positioning device for a stabilizing bar for vehicles, of any shape, provided with at least one rectilinear part which is the seat of a connection of the bar to the body of a vehicle; the positioning device comprising: an annular plug made of a relatively hard and rigid elastomer material, provided with a radial through cut made along an entire generator of the plug, so that the plug can be opened in the circumferential direction so as to be fitted on the said rectilinear part of the bar, surrounding means suitable for being mounted externally on the plug to prevent the opening thereof and close a lateral internal surface thereof, with pre-determined force, against an external lateral surface of the said rectilinear part of the bar, to lock the plug angularly with respect to the bar; and axial locking means of the plug with respect to the bar; characterized in that the said surrounding means comprise a continuous ring, free from splits, flexibly deformable in the circumferential direction, and a seat for the said ring comprising an annular grooving produced on an external lateral surface of the said plug; the said ring having, in non-deformed conditions, an internal diameter smaller than the bottom diameter of the said grooving, so as to be suitable for interference-coupling onto said plug, inside said grooving; the said ring being sufficiently flexible to deform circumferentially by a quantity such that it takes on a diameter greater than that of the external lateral surface of the said plug, so as to be able to be fitted to the plug, right inside the said grooving.

Preferably, the said axial locking means comprise: at least a depression of spherical profile, produced in pre-determined axial position on the said external surface of the said rectilinear part of the bar; and at least a projection, produced internally on the plug, radially projecting from the said internal lateral surface thereof. For example, the said depression is defined by an annular groove and the corresponding said projection is an annular projection; the said annular groove and annular projection being continuous, or produced in a discontinuous manner, in parts.

In this way it is possible to produce the device according to the invention at greatly reduced cost. In fact, the depression on the bar is preferably obtained by hot-pressing a surface portion of the said rectilinear part of the bar, an operation that is economical and simple and can easily be introduced into the current production cycle of stabilizing bars (it takes place during the hot-forming of the bar itself) and which comprises a reduction of the strength value of the steel of the bar of between 1% and 2% inclusive, which is absolutely negligible and with no effect on the fatigue strength of the bar itself. The plug and the associated surrounding ring can, on the other hand, be produced separately from the bar, using the usual injection moulding techniques for plastics materials (elastomers or not), using small and economical presses, given their limited dimensions (of the order of magnitude of the external diameter of the stabilizing bar, or a few cm), so as then to be fitted to the bar already finished and provided with the depression, by simple fitting of the plug and subsequent driving of the ring, driving which can be carried out with a hydraulic or pneumatic piston with few tens of kilograms of thrust.

The tests conducted have shown that the device described is capable of withstanding, without moving or rupturing, axial loads from 100 to 150 kg, i.e. much higher than those it can withstand in operation as a result of the stresses applied by the wheels and the body to the bar. Furthermore, the special geometry adopted for the depression and the relative projection, together with the relative closing position of the ring, determined by the position of the grooved seat produced externally on the plug, mean that any transverse loads, rather than trying to open the ring, bring about the stopping of the plug in the groove with consequent irreversibility of the mounting movement.

BRIEF DESCRIPTION OF THE DRAWINGS

Further features and advantages of the invention will emerge from the description of the following embodiments which are strictly non-exhaustive and given purely by way of example, with reference to the accompanying drawings in which.

DETAILED DESCRIPTION OF THE INVENTION

Figure 1:
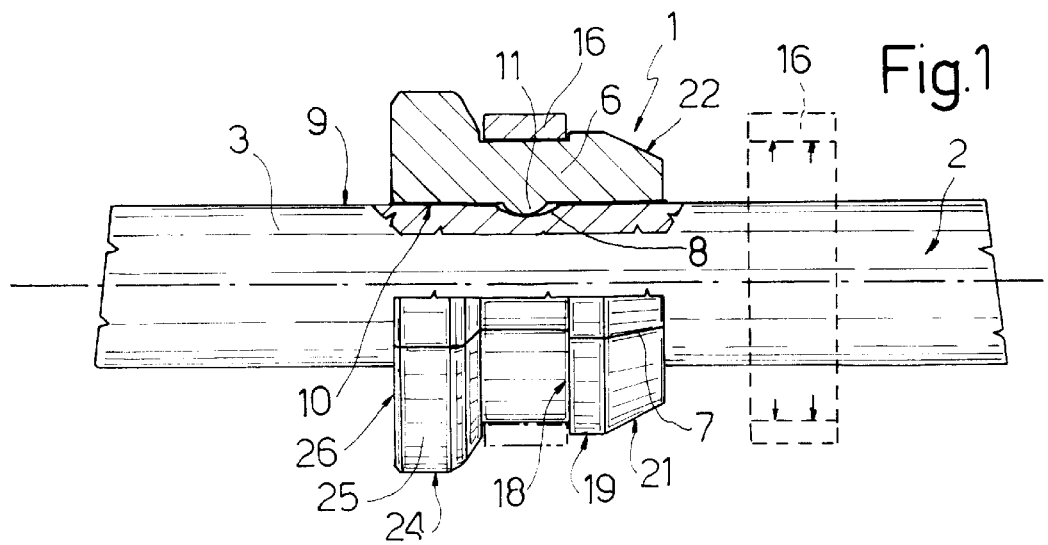
FIG. 1 shows an elevation and partially radial section of a positioning device for a stabilizing bar produced according to the invention.
Figure 2:
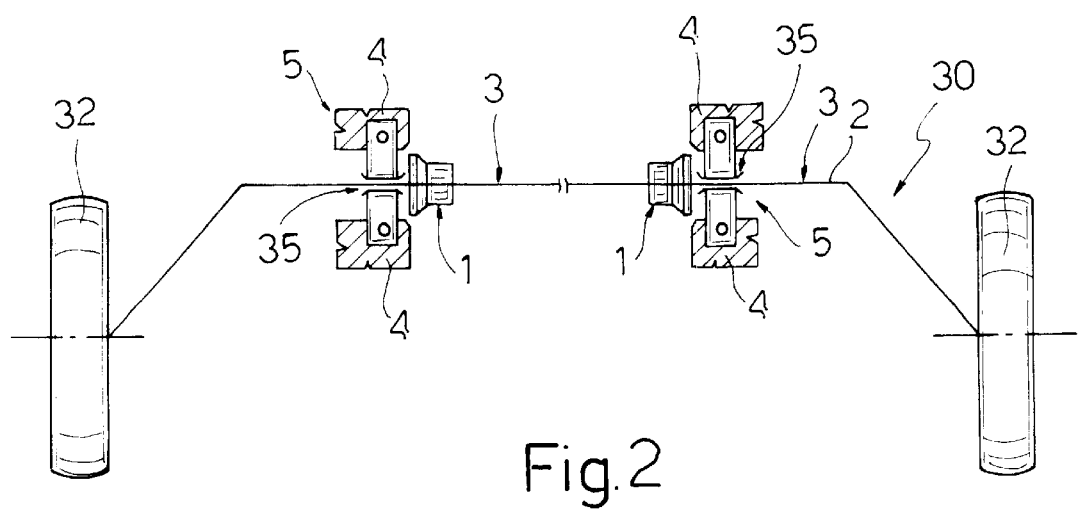
FIG. 2 shows a diagrammatic plan view from the top of a stabilization system for vehicles using the device of FIG. 1.

With reference to FIGS. 1 and 2, in its entirety 1 denotes a positioning device for a stabilizing bar 2 for vehicles. The bar 2 may have any shape, such as a trapezoidal shape as shown in FIG. 2, but in any event it is provided with at least one rectilinear part 3 which is the seat of connection of the bar 2 to one or more support(s) 5 (simply denoted as connections 5 below) for connection to the load-bearing structure of a vehicle, which is not shown for reasons of simplicity, such as the body (or the chassis) 4 of the said vehicle (FIG. 2).

The positioning device 1 according to the invention comprises an annular plug 6 made of an elastomer material (or of a relatively flexible synthetic plastic resin) which is relatively hard and rigid (with a high degree of crosslinkng for example), which is provided with a through (i.e. passing radially through the entire plug 6) radial cut 7 produced longitudinally along an entire generator of the plug 6. In this way the plug 6, which is produced with an internal diameter such as to be suitable for coupling to the part 3 of the bar 2 without play, may be opened like a book, in the circumferential direction, so as to be fitted on the rectilinear part 3 of the bar 2, in the position shown in FIG. 1.

The axial coupling position between annular plug 6 and part 3 is defined by a depression 8 which is formed, for example, by a continuous annular groove, like that shown in FIG. 1, or, according to a variant that is not illustrated, by a groove which is identical but discontinuous; in any event the groove 8 preferably has a spherical profile, produced in pre-determined axial position on a cylindrical external surface 9 of the part 3; in fact, internally on the plug 6 and radially projecting from an internal cylindrical lateral surface 10 thereof, there is a projection 11 suitable for coupling with the groove 8. The projection 11, which is an annular projection in the non-limiting shown embodiment, may be continuous or discontinuous, defined, for example, by ribs having limited circumferential development and arranged in a crown and being circumferentially spaced from each other. In any case it is passed through radially by the cut 7. Preferably the groove 8 is obtained by hot-deforming of a surface portion of the rectilinear part 3 of the bar.

The device 1 according to the invention further comprises surrounding means suitable for being mounted externally on the plug to prevent the opening thereof and, in use, with the plug coupled to the surface 9 of the part 3, to close the internal lateral surface 10 of the plug 6 against the said lateral surface 9 with force such as to lock the plug 6 axially and angularly with respect to the bar 2. In this case such surrounding means are defined by a continuous ring 16, free from splits, and shown in FIG. 1, in section, in the mounting position and, hatched, in the position preceding mounting.

The ring 16, simply produced for example by injection-moulding from an elastomer (such as silicone rubber) or from any other synthetic plastic resin with sufficient elasticity, is flexibly deformable in the circumferential direction to the extent that it is suitable for becoming interference-coupled to a seat for it carried by the plug 6 and comprising an annular grooving 18 (the lower part of the ring 16 shown in FIG. 1 in the fitted position is shown in dot-and-dash lines so that the seat 18 is easier to see) produced on an external lateral surface 19, generally cylindrical, of the plug 6.

For example the ring 16 is such as to have, in non-deformed conditions, an internal diameter smaller than the diameter of the bottom wall of the grooving 18 so as to be suitable, as already stated, for being interference-coupled to the plug 6, inside the grooving 18; and it must be sufficiently flexible to be capable of deforming circumferentially by a quantity such that it takes on a diameter greater than that of the external lateral surface 19 so as to be able to be fitted axially on the plug 6, right inside the grooving 18.

According to an important feature of the invention the annular grooving 18 is produced in an axial position corresponding to that of the internal, continuous or discontinuous, annular projection 11 of the plug 6, in particular it is axially centred with respect thereto and extends axially, just like the ring 16, for a length longer than the axial extension of the projection 11 and approximately equal to the axial length of the groove 8.

To facilitate the mounting of the ring 16, a first end 21 of the plug 6, immediately adjacent to the grooving 18, is delimited by a conical external surface 22 of diameter which decreases in the direction of moving away from the grooving 18; the surface 22 is thus suitable for cooperating with the ring 16, predisposed by the part of the end 21 (FIG. 1, dashed part) gradually to bring about the circumferential deformation thereof (in the direction of the arrows) under the effect of an axial thrust (shown by the arrow F) applied to the ring 16 from the side opposite the conical surface 22.

A second end 24 of the plug 6, also immediately adjacent to the grooving 18 but on the side opposite the end 21, is defined by collar 25 of external diameter greater than that of the lateral surface 19; the collar 25 is also delimited, on the side opposite the grooving 18, by a flat frontal abutment surface 26 which, when the plug 6 is firmly fixed to the bar 2 through the effect of the closing applied by the ring 16, comes to constitute an axial shoulder on the bar 2.

With reference to FIG. 2, the surface 26 is therefore suitable, in use, for cooperating with the connection supports (connections) 5 for the bar 2. Therefore, with the device 1 described, according to the invention it is possible to produce a stabilization system for a vehicle like that in FIG. 2, denoted in its entirety by 30. It comprises at least one torsion bar 2 like that described, arranged transverse to the vehicle, with respective opposite wheels 32 connected by one and the same axis; a pair of connections 5 of the bar 2 to the body or chassis 4 of the vehicle; and one or two devices 1 applied to the said part 3 or to two parts 3 which are spaced apart and each adjacent to a respective connection 5 of which the corresponding part 3 constitutes the attachment seat.

The supports or connections 5 are of known type and, in particular, are each equipped with an internal anti-friction sleeve 35 by means of which each connection 5 is coupled to the respective rectilinear part 3, its seat on the bar 2, to permit the free rotation of the bar with respect to that connection; according to the invention, in the immediate vicinity of at least one of the connections 5 (both of them in the example shown), the bar 2 is provided integral with a positioning device 1 like the one described, mounted so as to have the surface 26 facing towards the respective connection 5. In this way each plug 6 behaves like an axial shoulder suitable for cooperating with the adjacent connection support 5 of the bar 2, thus ensuring the axial locking of the latter with respect to the connections 5, notwithstanding the presence of the sleeves 35.

Figure 3:
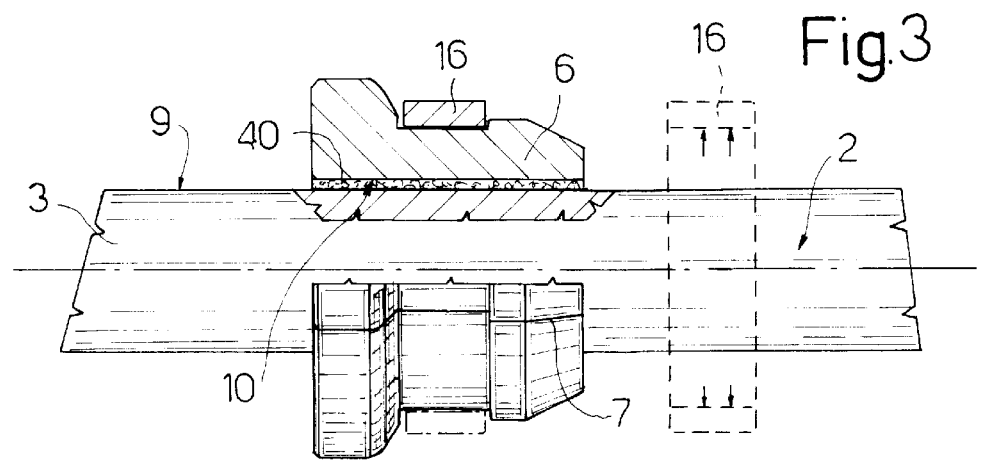
FIG. 3 shows an elevation and partially radial section of a possible variant of the device of FIG. 1.

In FIG. 3, in which the details similar to those already described with reference to FIGS. 1 and 2 are denoted with the same numbers, a possible variant to the positioning device according to the invention is shown. The axial locking of the plug 6 with respect to the bar 2 is obtained by using an adhesive layer 40 interposed between the internal lateral surface 10 of the plug 6 and the external lateral surface 9 of the rectilinear part 3 of the bar 2, and not by the coupling of the groove 8 with the projection 11.

The adhesive of the layer 40 is such as the layer itself, in use, is capable of opposing a transverse resistance of at least 150 Kg to axial movements of the plug 6. Preferably, the adhesive layer 40 is realized with an ethyl-cyanoacrylate, for example LOCTITE 480ä, and it is applied to the bar 2 by hot deposition before inserting the plug 6.

We claim:

1. A positioning device (1) for a stabilizing bar (2) for vehicles provided with at least one rectilinear part (3) which is the seat of a connection of the bar (2) to the body of a vehicle; the positioning device (1) comprising: an annular plug (6) made of a relatively hard and rigid elastomer material, provided with a radial through cut (7) made along an entire generatrix of the plug (6), so that the plug (6) can be opened in the circumferential direction so as to be fitted on the said rectilinear part (3) of the bar (2); surrounding means (16) suitable for being mounted externally on the plug (6) to prevent the opening thereof and close a lateral internal surface (10) thereof, with pre-determined force, against an external lateral surface (9) of said rectilinear part (3) of the bar (2), to lock the plug (6) angularly with respect to the bar (2); and axial locking means of the plug (6) with respect to the bar (2); characterized in that said surrounding means (16) comprise a continuous ring (16), free from splits, flexibly deformable in the circumferential direction, and a seat for said ring (16) comprising an annular grooving (18) produced on an external lateral surface (19) of said plug (6); the said ring (16) having, in non-deformed conditions, an internal diameter smaller than the bottom diameter of the said grooving (18), so as to be suitable for interference-coupling onto said plug (6), inside said grooving (18); the said ring (16) being sufficiently flexible to deform circumferentially by a quantity such that it takes on a diameter greater than that of the external lateral surface (19) of said plug (6), so as to be able to be fitted to the plug (6), right inside said grooving (18).

2. A positioning device according to claim 1, characterized in that said axial locking means comprise: at least a depression (8) of spherical profile, produced in pre-determined axial position on the said external surface (9) of said rectilinear part (3) of the bar (2); and at least a projection (11), produced internally on the plug (6), radially projecting from said internal lateral surface (10) thereof.

3. A positioning device according to claim 2, characterized in that said depression (8) is defined by an annular groove and the corresponding said projection (11) is an annular projection; the said annular groove (8) and annular projection (11) being continuous, or produced in a discontinuous manner, in parts.

4. A positioning device according to claim 2, characterized in that said depression (8) has been obtained by hot-deformation of a surface portion of said rectilinear part (3) of the bar (2).

5. A positioning device according to claim 2, characterized in that said annular grooving (18) on the external surface (19) of the plug (6) is produced in correspondence with said internal projection (11) of the plug (6), axially centered with respect thereto.

6. A positioning device according to claim 1, characterized in that said axial locking means comprise an adhesive layer (40) interposed between said plug (6) and said external lateral surface (9) of the said rectilinear part (3) of the bar (2).

7. A positioning device according to claim 6, characterized in that said adhesive layer (40) is capable of opposing a transverse resistance of at least 150 Kg to axial movements of the plug (6).

8. A positioning device according to claim 6, characterized in that said adhesive layer (40) is preferably made of an ethyl-cyanoacrylate, and it has been applied to said bar (2) by hot deposition before inserting said plug (6).

9. A positioning device according to claim 1, characterized in that a first end (21) of said plug (6), immediately adjacent to the annular grooving (18), is delimited by a conical external surface (22) of diameter which decreases in the direction of moving away from said grooving (18), suitable for cooperating with said ring (16) gradually to bring about the circumferential deformation thereof under the effect of an axial thrust (F) applied to the ring (16) from the side opposite said conical surface (22).

10. A positioning device according to claim 1, characterized in that a second end (24) of the said plug (6), immediately adjacent to the said annular grooving (18), is defined by a collar (25) of external diameter greater than that of the said external lateral surface (19) of the plug (6) provided with the said grooving (18); the said collar (25) being delimited, on the side opposite the said grooving (18), by a flat frontal abutment surface (26) suitable for cooperating in use with a connection support (5) for the said bar (2).

11. A stabilization system (30) for a vehicle, comprising: at least one torsion bar (2) arranged transverse to the vehicle, with respective opposite wheels (32) connected by one and the same axis, said bar (2) being provided with at least one rectilinear part (3); and a pair of connections (5) to the body of the vehicle; characterized in that said connections (5) each comprise an internal anti-friction sleeve (35) by means of which each connection is coupled to said rectilinear part (3) of the bar (2) to permit the free rotation of the bar (2)

with respect to the connection (5); and in that in the immediate vicinity of at least one of the connections (5), said bar (2) is provided integral with a positioning device (1) according to one of claims 1 to 10, so that said plug (6) behaves like an axial shoulder suitable for cooperating with the adjacent connection (5) of the bar (2) to the body, to ensure the axial locking of the bar (2) with respect to the connections (5).

* * * * *

UNITED STATES PATENT AND TRADEMARK OFFICE
CERTIFICATE OF CORRECTION

PATENT NO. : 5,884,926
DATED : March 23, 1999
INVENTORS : Carlo MUZIO and Adriano BENENTI It is certified that error appears in the above-identified patent and that said Letters Patent is hereby corrected as shown below:

In Claim 1, col. 6, line 1, delete "the".

Signed and Sealed this

Twenty-seventh Day of July, 1999

Attest:

Q. TODD DICKINSON

*Attesting Officer*  *Acting Commissioner of Patents and Trademarks*